June 18, 1929.  W. A. MERKLEIN ET AL  1,718,057
FEED MECHANISM FOR MEAT SLICERS
Filed July 14, 1927
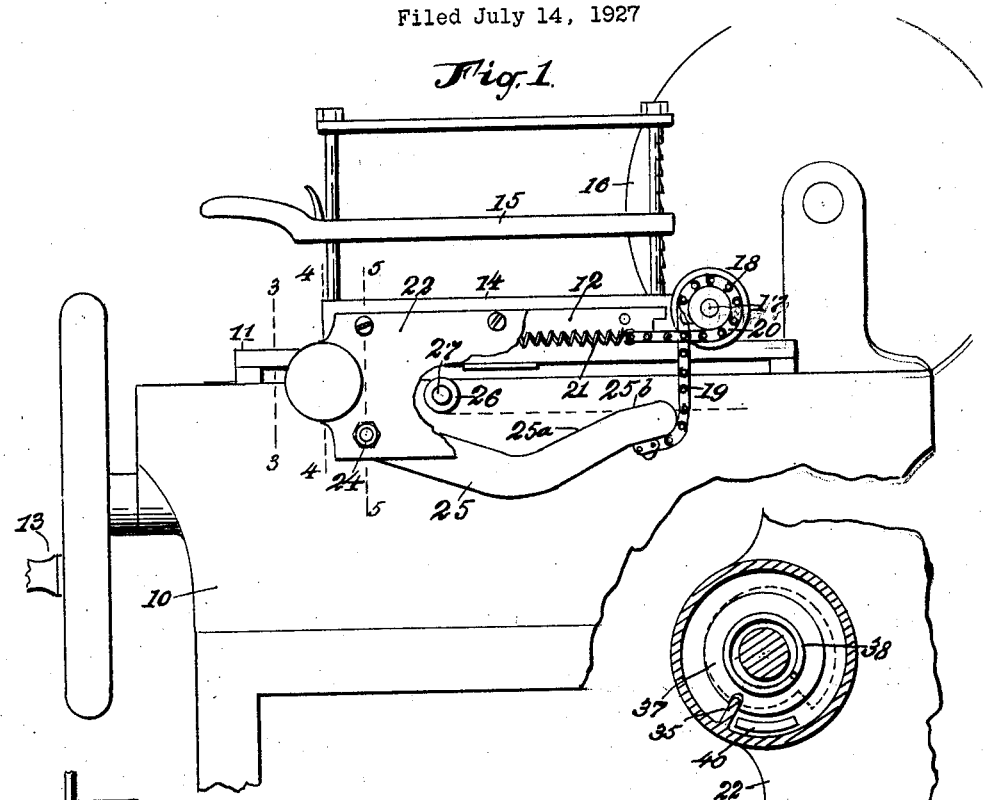
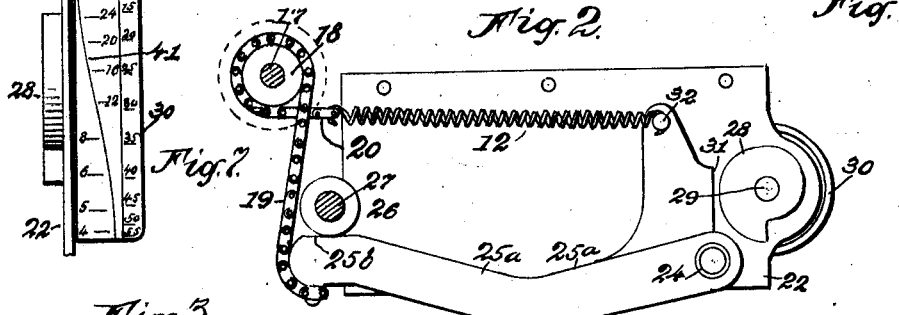
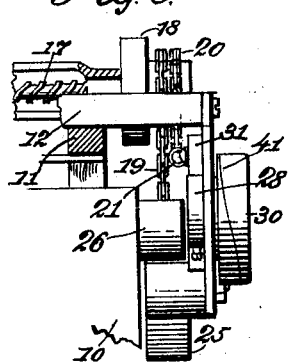
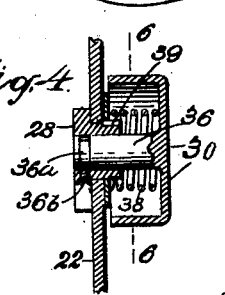
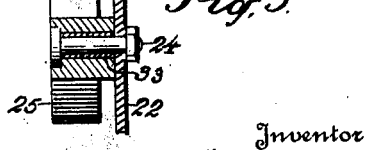
Inventor
William A. Merklein
Alex J. Dunn
By J. McSt. John
Attorney Patented June 18, 1929.

1,718,057

UNITED STATES PATENT OFFICE.

WILLIAM ANDREW MERKLEIN, OF BROOKLYN, NEW YORK, AND ALLEN I. DUNN, OF CEDAR RAPIDS, IOWA.

FEED MECHANISM FOR MEAT SLICERS.

Application filed July 14, 1927. Serial No. 205,811.

This invention relates to feed mechanism for machines having a reciprocating platform or carrier. The nature of the machine is well illustrated conventionally as applied to a meat slicer. In this machine as is well known, the meat is carried across a revolving blade, and and an automatic feed shifts the meat laterally to determine the thickness of the slice.

The object of this invention is to improve the feed mechanism specifically so as to secure a number of substantial benefits such as will appear in the description following.

The invention is fully disclosed in the description and claims following, reference being had to the accompanying drawing, in which:—

Fig. 1 is a fragmentary and conventional side elevation of a slicing machine to which this invention is applied. Fig. 2 is a view of the feed mechanism detached, and as seen from the inner side. Fig. 3 is a fragmentary end elevation of the feed mechanism as seen to the right of the line 3—3 of Fig. 1. Fig. 4 is a central vertical section of the stop and index mechanism in the line 4—4 of Fig. 1. Fig. 5 is a section of the cam-lever mounting in the line 5—5. Fig. 6 is a section of the stop and index mechanism in the line 6—6, looking to the left. Fig. 7 is an end elevation of the index knob on an enlarged scale.

In the drawing, the numeral 10 denotes the main frame or bed of the meat slicer of well known manufacture. On this bed, and carried by guides one of which, 11, is shown, is mounted a platform 12, to which a reciprocating movement along the guides is imparted through mechanism not shown, and by means of a hand crank 13. Over the platform, and mounted to slide crosswise thereof is mounted a carrier 14 to which the mass of meat is securely clamped by means of the clamp lever 15. The rotation of the crank wheel transmits a rather rapid motion to the slicing cutmits 16, which traverses the meat as the carrier is moved back and forth. The intermittent movement is imparted to the carrier sidewise on the back stroke of the platform and by means of a steeply pitched feed screw 17 attached by a mounting not shown to the platform and engaging the carrier in a manner so familiar as to need no description. The feed screw is provided with a reciprocating clutch 18, which is rotated in the feeding direction by means of a chain belt 19 and in the opposite direction by a similar belt 20 in cooperation with a tension spring 21. The parts above described are all of familiar construction and such as appear in the machine in general use, subject to slight modifications in adapting the improved feed apparatus thereto.

The feed apparatus which forms the subject matter of this invention, is very simple and is described as follows: A side-plate 22 attached to the platform 12 carries a cam-lever 25 pivoted to the side-plate at 24. The free end of this lever connects with the feed chain 19, so that a depression of the cam-lever will produce a positive feeding action to the feed clutch 18. The cam as will be seen has an inclined face 25' which terminates a little distance short of the end of the lever leaving a level neutral space 25$^b$. In the reciprocating movement of the platform the cam is intercepted by a roller 26 mounted on a stud 27 fixed to the bed of the machine. It will be evident that the back stroke of the platform and when nearing the terminus of its movement in this direction the roller will intercept the cam, and by depressing it impart a feeding motion to the feed clutch. This movement however terminates when the neutral part of the cam lever passes under the intercepting roller. The recoil movement of the clutch is effected by the tension of the spring 21, which is specially mounted as shown in Fig. 2 and as will be described presently.

It will be evident that the spacing of the feed is determined by the lift and depression of the cam-lever. This lift of the lever is regulated as desired by means of an adjustable stop 28 engaging some part of the cam-lever, in practice the stop itself is formed as a helical cam mounted on a pivot 29 and suitably connected with a hand knob 30, by means of which it can be turned to any desired position. To engage the stop the lever is provided with an upstanding arm 31, set at the side of the cam-lever so as not to intercept the roller 26, and adapted to abut against the stop on the upstroke of the cam-lever. In practice this arm is extended upwardly and to it at 32 is connected one end of the tension spring 12. The effect of this construction is to somewhat limit the stretch of the spring, as compared with a fixed connection to some stationary part, since, as will be evident the spring connection itself rocks forwardly with the downward motion of the cam-lever.

It is to be noted that the pivot of the cam-lever and of the arresting stop therefor, are both mounted on the same plate and in fixed relation to each other. This gives perfect stability to the parts and subject to such slight lost motion as may in time arise from the wear of these pivotal parts, insures perfect accuracy in the throw of the cam-lever. It is further to be noted that none of the feeding stresses are brought to bear upon any part of the stop or index mechanism, but on the contrary the feed motion of the cam is directly away therefrom, and the only wearing effect upon the stop is due to the comparatively slight impact of the cam-lever as drawn back by the recoiled spring. This is calculated to give great accuracy to the feed and long endurance to the operating parts. A further point to be noted is the fact that the reciprocating movement of the platform and its connected feed apparatus carries the cam-lever back beyond the point where the intercepting roller makes contact with the incline and to the level neutral portion of the cam-lever. This of course insures that the depression of the cam will always be exactly the same and regardless of the feed spacing due to variations in the lift of the cam-lever. It is further to be noted, referring to Fig. 3 that the stresses of the feed mechanism are all brought to bear in a vertical plane central to the cam-lever. The effect of this is to prevent any twisting strains on any part of the feed mechanism such as would be calculated to produce unequal wear and consequent inaccuracy in feed spacing.

In Fig. 5 is shown a detail of the pivotal mounting of the cam-lever, which is well adapted to this special purpose. The lever is bored to receive a bushing 33 on which the cam-lever rocks and is counter-bored to receive the head of the stud bolt 34 by which it is secured to the side plate. This leaves no projecting part to obstruct the movement of the platform as it traverses the bed and passes the intercepting roller 26. Though not so shown, the same mechanical device substantially is applied to the mounting of the roller 26.

The construction of the index mechanism and its connection with the adjustable stop is illustrated in Figs. 4, 6 and 7. The index member 30, which may be briefly designated as the knob is preferably formed as a hollow shell provided with a central stud 36 to engage the hub of the stop. The attachment is by a blind set screw 37 engaging a groove 36ª in the stud. A rib 35 is adapted to engage a notch in a friction disc 37 to keep it from turning in the knob and between this disc and the outer side of the knob is placed a compression coil spring 38, the purpose of which is to give sufficient frictional contact with the side plate to prevent any possible slippage of the stop in the operation of the machine. In Fig. 4 is shown an alternative fastening for the friction disc, a spline 39 serving in place of the rib 35ª.

In the practical operation of a slicing machine a great accuracy is desirable and is sometimes demanded, so that the thickness of the successive slices shall be perfectly uniform. This of course involves nicety in the adjustment of the stop with respect to the cam-lever. To secure this initial accuracy of adjustment provision is made whereby the knob is prevented from making a complete revolution. This is shown in Fig. 6 where it will appear that a lug 40 intercepts the rib 35ª and permits it to turn a little less than a full revolution. This allows for a little shifting of the helical stop on its axis for adjustment. In the initial setting of the stop the cam-lever will be fully depressed, and then with the index knob at zero the stop will be turned so as to just contact with the cam-lever shoulder and set in that position by means of the fastening set screw.

The periphery of the knob is shown provided with a spacial index and also with graduated numerical indexes for the special convenience of the operator. The spacial index is simply a spiral gauge-line 41 traced in any suitable way on the periphery of the knob. Assuming zero to be at the upper central position of the knob, the distance of this line from the inner edge of the knob (which is supposed to run close to the side-plate) will be the exact thickness of the slice cut, with the knob and stop in any of its gauging positions. This thickness may also be indicated by numerical graduations, the inner one shown in Fig. 7, for example, denoting numbers of slices to the inch, and the outer series denoting decimal or fractional parts of an inch.

Referring to the cam-lever (or cam), it will again be noted that the final back stroke of the reciprocating platform (the feed-stroke away from the cutter), the neutral space at the end of the cam-lever passes under the deflecting roller. The main purpose of this is to insure positive and absolutely uniform accuracy in the depression of the cam at every stroke. Upon this and the setting of the gauge-stop depends the thickness of the slice. If, on the other hand, the stroke terminates with the inclined part of the cam and the deflecting member in contact, the feed may vary more or less according to the speed of the machine in reciprocating the platform, or according to looseness and lost motion in the actuating parts, which would of course affect the throw of the platform, and correspondingly affect the feed.

Thus constructed, the feed mechanism is adapted to secure very accurate movement of the carrier with respect to the slicing blade.

It is also so simple in its structure, and has so few moving and wearing parts as to give it long life and endurance, with a minimum of friction to interfere with the easy operation of the machine as a whole.

Having thus described our invention, we claim:

1. In a machine having a reciprocating platform carrying reciprocating feed mechanism and a supporting bed for said platform, a cam-lever carried by the platform, a fixed deflecting member set to intercept said cam-lever in its reciprocating movement and a fixed stop to arrest the recoil movement of the cam-lever.

2. In a machine having a reciprocating platform and reciprocating feed apparatus carried thereby, a cam-lever carried by the platform and having a terminal neutral face, a fixed deflecting member to intercept the cam-lever and in the final position to engage said neutral space and a stop to arrest the recoil movement of the cam-lever.

3. In a machine having a reciprocating platform, a supporting bed therefor and reciprocating feed mechanism carried by the platform, actuating mechanism for said feed, comprising a cam-lever pivoted at one end to a part of the platform connected operatively at the other end with said feed mechanism, a fixed deflector for said cam-lever set in the path of its movement in one direction and a stop to arrest the counter movement of the cam-lever.

4. In a machine having a reciprocating platform, a supporting bed therefor, reciprocating feed mechanism carried by the platform and a support for feed actuating mechanism, a cam-lever pivoted to said support and operatively connecting with a reciprocating feed apparatus at its free end, an intercepting deflecting member fixed in the path of the cam-lever and an adjustable stop to limit the counter movement of the cam-lever.

5. In a machine of the designated class having a reciprocating platform, a supporting bed therefor and reciprocating feed mechanism carried by the platform, a rocking cam-lever carried by said platform and operatively connecting with said feed mechanism, a deflecting member fixed in the path of said cam-lever, a counter acting spring co-operating with the cam-lever, and a stop to gauge the recoil of the cam-lever.

6. In a machine having a reciprocating platform, a supporting bed therefor and reciprocating feed mechanism, actuating mechanism for said feed, comprising a cam-lever pivotally carried by said platform and operatively connecting at its free end with the feed mechanism, a stop to arrest the recoil movement of the cam-lever and an intercepting member fixed in the path of the cam-lever and adapted to move it away from the stop during its feeding movement.

7. Feed actuating mechanism for a machine of the designated class, combining a rocking cam-lever carried by a reciprocating platform, a fixed intercepting member in the path of the cam-lever and an adjustable stop carried by the platform and in fixed relation to the cam-lever support.

8. Feed actuating mechanism for a machine of the designated class, comprising a reciprocating platform, a rocking cam-lever carried thereby, an intercepting and deflecting member fixed in relation to the cam-lever, an adjustable stop carried by the cam-lever support and in fixed relation thereto and means for adjusting said stop to vary the stroke of the cam-lever.

9. Feed mechanism for a machine of the designated class having a reciprocating platform and a reciprocating feed carried thereby, comprising a rocking cam-lever, a fixed intercepting deflecting member, means operatively connecting said lever at its free end with the reciprocating feed, a recoil spring to restore the cam-lever to initial position and an arm extending from the cam-lever, to which arm one end of the spring is connected.

10. Feed mechanism for a machine of the designated type, comprising a rocking cam-lever, a fixed deflecting member traversed by the cam-lever, recoil means to restore the cam-lever to initial position, an adjustable stop to limit the recoil movement and a graduated index knob connected to said stop.

11. In feed mechanism of the designated class, the combination of a rocking cam-lever, a support therefor, a variable stop to arrest the cam-lever in its recoil movement, an index knob attached to the axis of said stop and means engaging said knob and the stop support to give frictional contact of the knob and said support.

12. In feed mechanism of the designated class, the combination of a rocking cam-lever, a support therefor, an intercepting deflecting member and means to restore the cam-lever to initial position, a helical stop, an index knob connecting therewith and a friction disc and spring interposed between the knob and support.

13. In feed mechanism of the designated type, a rocking cam-lever in operative connection with reciprocating feed mechanism, means to restore the cam-lever to initial position, an intercepting member to actuate the cam-lever in its feeding movement, a variable stop to regulate the recoil of the cam-lever and a knob connecting with said stop and provided with a spiral peripheral index line.

14. Feed mechanism for a machine of the designated type, comprising a rocking cam-lever, a support therefor, a helical stop carried by the same support, an index knob connecting axially and adjustably with said stop, and means adapted to limit the revolution of the knob to less than a complete turn, whereby the stop may be set for any desired adjustment with relation to the knob and lever arm.

15. In feed mechanism of the designated type, a rocking cam-lever in operative connection with reciprocating feed mechanism, means to restore the cam-lever to initial position, an intercepting member to actuate the cam-lever in its feed movement, and a variable stop to gauge the recoil of the cam-lever.

In testimony whereof we affix our signatures.

WILLIAM ANDREW MERKLEIN.
ALLEN I. DUNN.